(12) United States Patent
Tan et al.

(10) Patent No.: US 10,315,804 B2
(45) Date of Patent: Jun. 11, 2019

(54) REINFORCED BAG SEAM AND METHOD FOR MAKING SAME

(71) Applicants: Daniel Brian Tan, Harahan, LA (US); David H. G'Sell, Sr., Harahan, LA (US)

(72) Inventors: Daniel Brian Tan, Harahan, LA (US); David H. G'Sell, Sr., Harahan, LA (US)

(*) Notice: Subject to any disclaimer, the term of this patent is extended or adjusted under 35 U.S.C. 154(b) by 615 days.

(21) Appl. No.: 14/506,836

(22) Filed: Oct. 6, 2014

(65) Prior Publication Data

US 2015/0353239 A1    Dec. 10, 2015

Related U.S. Application Data

(62) Division of application No. 14/298,934, filed on Jun. 8, 2014, now Pat. No. 8,939,875.

(51) Int. Cl.
  *B65D 33/00*    (2006.01)
  *B65D 33/02*    (2006.01)
  (Continued)

(52) U.S. Cl.
  CPC .......... *B65D 33/02* (2013.01); *B29C 48/0019* (2019.02); *B29C 48/08* (2019.02); *B65D 33/002* (2013.01); *B65D 33/065* (2013.01); *B65D 33/08* (2013.01); *B29C 48/0021* (2019.02); *B29C 48/0022* (2019.02); *B29C 48/10* (2019.02);
  (Continued)

(58) Field of Classification Search
  CPC .. B65D 33/001; B65D 33/002; B65D 33/008; B65D 33/02; B65D 33/16; B65B 7/14

USPC ..... 383/37, 88, 107, 108, 119, 121–124, 89; 156/204; 493/231, 235, 236, 243, 250,
  (Continued)

(56) References Cited

U.S. PATENT DOCUMENTS

| 2,146,831 | A | * | 2/1939 | Maxfield | B65B 9/093 |
| | | | | | 229/69 |
| 3,254,829 | A | * | 6/1966 | Cooper | B65D 75/5805 |
| | | | | | 383/209 |

(Continued)

OTHER PUBLICATIONS

International Search Report and Written Opinion dated Apr. 29, 2014 in Corresponding International Application No. PCT/US2013/056166 filed Aug. 22, 2013.

*Primary Examiner* — Jes F Pascua
*Assistant Examiner* — Nina K Attel
(74) *Attorney, Agent, or Firm* — David A. Belasco; Belasco Jacobs & Townsley, LLP

(57) ABSTRACT

A method for making a film bag with reinforced bag seams includes a film extruder that produces a continuous tube of film. A flattener produces a continuous web of flattened film which has an upper surface and a lower surface. A fold maker has a receiving portion positioned above the web and a displacing portion is positioned below the web that moves cyclically upward to a first position to locate a portion of the web into the receiving portion, thereby forming a fold. A fold retention device prevents the fold from opening. A presser flattens the fold against the web. A sealer seals through the fold, forming a reinforced bag seam. A cutter severs a sealed portion from an unsealed portion of the web. A transport mechanism moves the film from the extruder, through the flattener, into the fold maker, beneath the presser, into the sealer and to the cutter.

11 Claims, 12 Drawing Sheets

(51) Int. Cl.
  B29C 48/08 (2019.01)
  B29C 48/00 (2019.01)
  B65D 33/06 (2006.01)
  B65D 33/08 (2006.01)
  *B29L 31/00* (2006.01)
  *B29C 65/00* (2006.01)
  *B29C 65/02* (2006.01)
  *B31B 160/10* (2017.01)
  *B31B 70/14* (2017.01)
  *B31B 155/00* (2017.01)
  *B31B 70/26* (2017.01)
  *B31B 70/64* (2017.01)
  *B31B 70/86* (2017.01)
  *B29C 48/10* (2019.01)

(52) U.S. Cl.
  CPC .......... *B29C 65/02* (2013.01); *B29C 66/0324* (2013.01); *B29C 66/1122* (2013.01); *B29C 66/135* (2013.01); *B29C 66/21* (2013.01); *B29C 66/3452* (2013.01); *B29C 66/4312* (2013.01); *B29C 66/81429* (2013.01); *B29C 66/8511* (2013.01); *B29C 2793/009* (2013.01); *B29C 2793/0027* (2013.01); *B29L 2031/7129* (2013.01); *B31B 70/14* (2017.08); *B31B 70/266* (2017.08); *B31B 70/44* (2017.08); *B31B 70/645* (2017.08); *B31B 70/874* (2017.08); *B31B 2155/00* (2017.08); *B31B 2155/003* (2017.08); *B31B 2155/0012* (2017.08); *B31B 2160/10* (2017.08)

(58) Field of Classification Search
  USPC ....... 493/251, 260, 261, 262, 162, 167, 168, 493/177, 180, 157
  See application file for complete search history.

(56) References Cited

U.S. PATENT DOCUMENTS

| | | | |
|---|---|---|---|
| 3,462,070 A * | 8/1969 | Corella | B65D 33/22 206/219 |
| 3,548,723 A | 12/1970 | Sengewald | |
| 3,618,478 A | 11/1971 | Piazze | |
| 3,622,421 A | 11/1971 | Cook | |
| 3,850,724 A | 11/1974 | Lehmacher | |
| 3,956,045 A * | 5/1976 | Hoffman | B29C 66/83221 156/227 |
| 4,057,949 A * | 11/1977 | Greffe | B65B 1/26 383/100 |
| 4,529,090 A * | 7/1985 | Pilon | B65D 33/001 206/494 |
| 4,560,067 A | 12/1985 | Reimann | |
| 4,680,024 A | 7/1987 | Focke | |
| 4,931,034 A | 6/1990 | Wagner | |
| 5,338,118 A | 8/1994 | DeMatteis | |
| 5,709,641 A | 1/1998 | Vaquero | |
| 6,059,707 A | 5/2000 | Belies | |
| 6,170,985 B1 | 1/2001 | Shabram | |
| 6,767,317 B2 | 7/2004 | Simhaee | |
| 6,918,699 B2 | 7/2005 | Hanson | |
| 6,923,574 B2 | 8/2005 | Siegel | |
| 7,963,898 B2 | 6/2011 | Tan | |
| 2004/0032992 A1 | 2/2004 | Hershku | |
| 2005/0041890 A1* | 2/2005 | Tan | B65D 33/001 383/37 |
| 2010/0022375 A1 | 1/2010 | Colla | |
| 2010/0270309 A1* | 10/2010 | Files | B32B 27/32 220/359.1 |
| 2011/0038567 A1 | 2/2011 | Chen | |

* cited by examiner

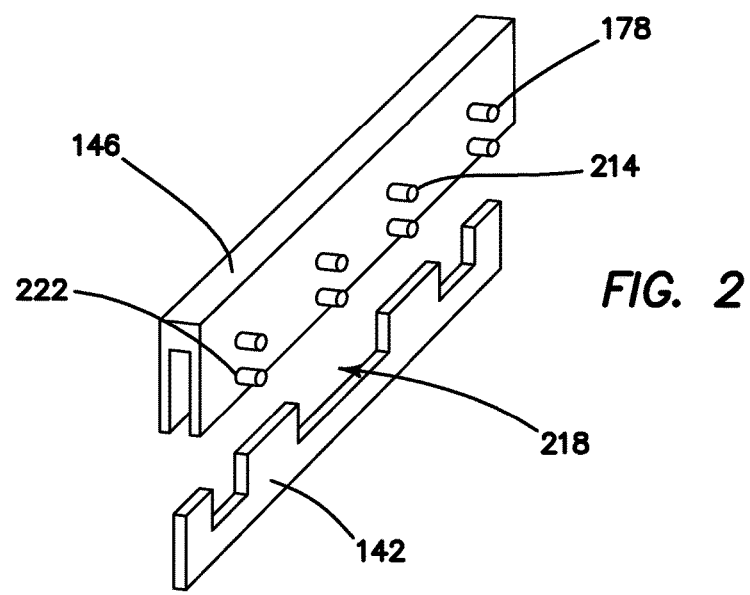
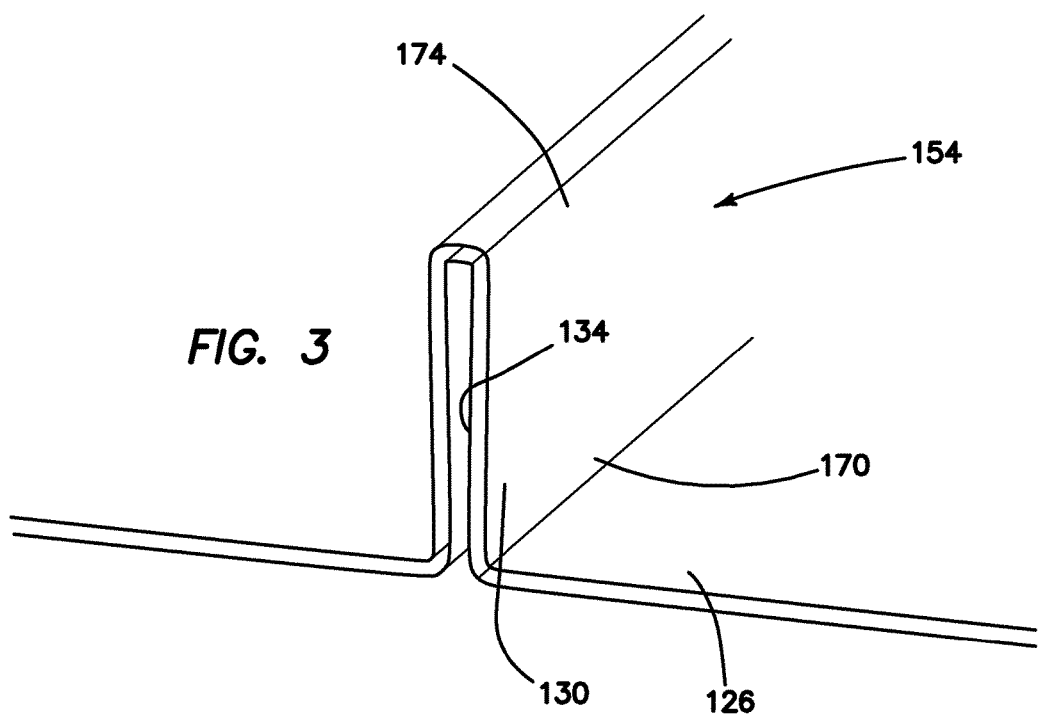

REINFORCED BAG SEAM AND METHOD FOR MAKING SAME

RELATED APPLICATION

The instant application is divisional of pending U.S. patent application Ser. No. 14/298,934, filed Jun. 8, 2014, which is a continuation of PCT Application Serial No. PCT/US2013/056166 filed on Aug. 22, 2013 and claims priority to the filing date thereof.

FIELD OF INVENTION

The invention pertains to plastic and other film bags typically used for produce or other merchandise. More particularly, the invention relates to reinforced seams for such bags and methods for making the bags.

BACKGROUND OF THE INVENTION

Plastic and other film produce bags are commonly used in supermarkets, grocery stores and other markets where sanitation and ease of use in limited spaces are important factors. These bags have advantages in that they are relatively inexpensive to produce, provide substantial carrying capacity and may include easy opening features. Most bags are produced with a heat welded bottom seam. Many bags have side or bottom gussets to provide for increased carrying capacity or to provide convenient carrying handles in "T-shirt" style gusseted bags. In both gusseted and ungusseted bags, the weakest point is usually at the bottom bag seal. For gusseted bags the weakest point is typically at the point where the bottom seal of the gussets joins the bottom seal for the ungusseted portion of the bag. The present invention provides for a substantially stronger bottom seal for both gusseted and ungusseted bags. In addition, the same technology is used to provide T-shirt style bags with substantially stronger handles.

U.S. Pat. No. 4,931,034, issued to Wagner is directed to bags made from thermoplastic synthetic resin sheeting having cutoff weld seams and process for producing the bags. The bags have a bottom and/or lateral seam fashioned as a cutoff weld seam which are severed by transverse cutoff weld seams from tubular film sheets optionally provided with lateral creases. The bottom seam is designed to be reinforced in the form of a cutoff weld seam and to allow the bags to be readily set in an upright position since there is no interfering protrusion in the seam zone on the outside. The shopping bags may be produced from a tubular sheet with lateral pleats transported in succession into the welding stations. In the first welding station, the flush seam is welded with a certain width in the zone of the subsequent bottom cutout seam over the entire breadth of the tubular sheet. Utilizing the technique of a welding blade, the application of heat is effected unilaterally and the welded material is severed into two parts and simultaneously weld seams are created on both sides of the parting line. While the welding bar produces the flush seam, the wire or the hot strip merely affects a cutting step thus allowing for two flush seams to be produced simultaneously and severed by means of a hot wire. Thus, the invention is able to produce bags with an improved strength and tear resistance of the bottom seams of the plastic bags.

U.S. Pat. No. 3,618,478, issued to Piazze, discloses a three dimensional bag with reinforced bottom and method of forming the same. This patent describes the formation of flexible bags from heat sealable plastic film in order to provide a square or rectangular bottom structure that is thus "reinforced" and thus provides a stronger bag. The heat sealable plastic film material utilizes supplementary seals in the gusseted bottom structure which strengthens the bottom end areas in order to prevent rupturing when the bag is filled with a flowable product. The ends of the gusset bottom folds are sealed to the sidewalls by extensions of the side seals such that the inner fold line and side seal lines are joined together with the outer gusset folds in order to provide the additional strength. The bag is formed from two rectangular wall forming panels which are flattened upon one another and connected along the side edges by bead-like seals or welds. The bag bottom is formed with a folded edge connecting the two wall panels wherein the fold is a bellows-type or an infolded gusset to provide a bottom structure consisting of two panels on the opposite sides of a center-fold. The meeting points are at the juncture of the gusset inner fold and the side seals which provides triangular areas at the base of the vertical side thus providing multiple thicknesses of material and the increased strength.

U.S. Patent Application No. 2010/0022375 published for Colla is directed to a method for the production of packaging bags having a reinforced base region and a device for carrying out the method. It is thus proposed to have a folded and bonded base reinforcement providing a high loading capacity with the folded portion providing the extra layers that are thus held by an adhesive to make the bag stronger. A pair of rollers is used to draw the continuous film web toward the cutting unit wherein the web has a portion forming the folding portion that protrudes beyond a retaining device. When the film web reaches its end position, the film is severed in the cutting unit and subsequently adhesive is provided by a plurality of nozzles and ultimately a bond is formed with the folding portion. After the hot glue is applied, the folding portion which protrudes beyond the retaining unit is folded over and upward along a folding line and pressed from above onto the film by means of a folding device.

U.S. Pat. No. 3,622,421, issued to Cook is directed to a method for forming bags from thermoplastic tubing particularly concerned with a method for forming bags by transversely perforating and sealing a flattened tube of thermoplastic film material thus dividing the web into connected series of bags. The web is passed through a perforating unit which applies lines of transverse perforations at intervals corresponding to the length of the finished bag. The web then passes through a pair of draw rolls and ultimately around a drum with spaced vacuum ports only enabling a seal to be formed. The web then passes beneath a sealing bar with heating elements such that a transverse seal is formed. After cooling, the web passes through a perforating mechanism that defines one bag from the succeeding bag and ultimately the web is wound onto a reel.

U.S. Pat. No. 3,850,724 issued to Lehmacher is directed to an apparatus and method for fabrication of carrying bags including reinforced double walled plastic carrying bags. The high carrying strength bags are formed utilizing a side-folded and seam bottom welded thermoplastic film bag structure with a double wall comprised of two thermoplastic films. The main body portion of a length of thermoplastic flattened tube longitudinally is infolded at opposite vertical margins to form a pair of infold panels. Handles or grip elements which are formed of thermoplastic film material are attached to and extend above the bag mouth outer margin utilizing a tape strip. The method provides for formation of a flat and well defined rectangular bottom bags with wall panel reinforcement. The front and rear wall panels of the body of the bag are comprised of inner and outer layers with a reinforcing insert disposed therebetween. Each insert runs across the entire bag to the infold edges from a location downwardly from the bag mouth edge. Grip elements are secured by an adhesive tape strip thus providing reinforcement for the handle portions.

While other variations exist, the above-described designs for reinforced bags are typical of those encountered in the prior art. It is an objective of the present invention to provide merchandise and produce bags with substantially stronger bottom seams. It is a further objective to provide T-shirt style bags that lack the typical points of weakness adjacent the joint of the bag gusset seams with the bag bottom seam. It is yet a further objective to provide T-shirt style bags with substantially stronger handles. It is a still further objective of the invention to provide bags with stronger seams that use a minimal amount of additional film material to provide the additional strength. Finally, it is an objective of the invention to provide methods and apparatus for production of such high strength bags that are simple and economical to use.

While some of the objectives of the present invention are disclosed in the prior art, none of the inventions found include all of the requirements identified.

SUMMARY OF THE INVENTION

The present invention addresses all of the deficiencies of prior art reinforced bag seam inventions and satisfies all of the objectives described above.

(1) A film bag with reinforced bag seams can be constructed from the following components. A front wall and a back wall are provided. The walls are joined at first and second side edges. Each of the front and back walls has a top edge and a bottom edge. A fold is provided. The fold is located in the front and back walls. The fold is positioned in a plane parallel to said front wall. At least one pair of the top and bottom edges is sealed together at either of an upper seam and a lower seam through the fold and at least six layers of film.

(2) In a variant of the invention, first and second side gussets are provided. Each of the gussets is folded inwardly from one of the first and second side edges. The gussets have a top edge and a bottom edge. At least one pair of the top and bottom edges of the gussets is sealed together at either of the upper seam and the lower seam through the fold and at least twelve layers of film.

(3) In another variant, the bag with reinforced seams includes an open bag mouth and a handle aperture. The handle aperture penetrates the front wall and the back wall.

(4) In still another variant, the top and bottom edges are sealed together at the upper seam and the lower seam through the fold and at least six layers of film. The bag further includes a cut-out. The cut-out commences at a first point along the upper seam spaced inwardly from the first side edge and extends to a second point along the upper seam spaced inwardly from the second side edge. The cut-out extends downwardly toward the lower seam, thereby defining an open bag mouth and first and second bag handles.

(5) In yet another variant, the top and bottom edges of the gussets are sealed together at the upper seam and the lower seam through the fold and at least twelve layers of film. The bag further includes a cut-out. The cut-out commences at a first point along the upper seam spaced inwardly from an outside edge of the first gusset and extends to a second point along the upper seam spaced inwardly from an outside edge of the second gusset. The cut-out extends downwardly toward the lower seam, thereby defining an open bag mouth and first and second bag handles.

(6) In a further variant, the top edges of the film bag are joined at a perforation to a header portion. The header portion is removed from the bag for use of the bag.

(7) In still a further variant, at least one aperture is provided for suspending a pack of the bags from a dispensing fixture.

(8) In yet a further variant, the film includes about 40-48 wt. % high density, high molecular weight polyethylene, 12-20 wt. % high density, medium molecular weight polyethylene, 20-30 wt. % linear low density polyethylene, 0-8 wt. % color concentrate.

(9) In another variant of the invention, the film includes 0.5 wt. % slip and antiblock compound.

(10) In still another variant, the film includes 1-3 wt. % calcium carbonate.

(11) In yet another variant, the film includes 10-20 wt. % recycled material, the recycled material includes about 40-48 wt. % high density, high molecular weight polyethylene, 12-20 wt. % high density, medium molecular weight polyethylene, 20-30 wt. % linear low density polyethylene, 0-8 wt. % color concentrate.

(12) In a further variant, the 10-15 wt. % of the linear low density polyethylene has a density ranging from 0.923-0.924 gm/cc.

(13) In still a further variant, the 10-15 wt. % of the linear low density polyethylene has a melt index ranging from 0.25-0.30 gm/10 minutes.

(14) In yet a further variant, the high density, medium molecular weight polyethylene has a density ranging from 0.937-0.947 gm/cc.

(15) In another variant of the invention, the high density, medium molecular weight polyethylene has a melt index ranging from 0.10-0.30 gm/10 minutes.

(16) In still another variant, an apparatus for making a film bag with reinforced bag seams, includes a film extruder. The extruder produces a continuous tube of film material. A flattener is provided. The flattener produces a continuous web of flattened film material. The web has a first surface and a second surface. A fold maker is provided. The fold maker has a displacing portion and a receiving portion. The receiving portion is positioned adjacent the first surface of the web. The displacing portion is positioned adjacent the second surface of the web and moves cyclically toward the second surface to a first position to locate a portion of the web into the receiving portion, thereby forming a fold in the web. The displacing portion moves cyclically away from the second surface to a second position outside of the fold. The fold has a leading surface, a trailing surface, a first edge positioned adjacent the web and a second edge spaced from the first edge.

A fold retention device is provided. The retention device prevents the fold from opening as the web moves through the apparatus. A presser is provided. The presser is positioned adjacent the first surface the web and urges the fold against the web after folding. A sealer is provided. The sealer provides at least one seam across the web through the fold, thereby sealing at least six layers of film together to form a reinforced bag seam. A cutter is provided. The cutter severs a sealed portion of the web from a remaining portion of the web. A transport mechanism is provided. The transport mechanism moves the flattened film material from the extruder, through the flattener, into the fold maker, beneath the presser, into the sealer and to the cutter.

(17) In yet another variant, the fold retention device further includes at least one tack welding element. The element welds the web through the fold from the leading surface surface to the trailing surface. The element is sized, shaped and positioned to weld the web through the fold adjacent the first edge.

(18) In a further variant, the element is sized, shaped and positioned to weld the web through the fold adjacent the first edge and adjacent the second edge.

(19) In still a further variant, the displacing portion of the fold maker includes at least one opening, the opening is sized, shaped and positioned to provide a path for welding the upper surface to the lower surface.

(20) In yet a further variant, the transport mechanism includes first and second drive rollers. The first drive roller is movably located adjacent the web before the fold maker and the second drive roller is located in contact with the web between the presser and the sealer. The first drive roller is out of contact with the web when the displacing portion of the fold maker is in the first position to locate a portion of the web into the receiving portion to form the fold. The first drive roller is in contact with and driving the web when the displacing portion of the fold maker is in the second position outside of the fold, thereby preventing the fold from opening as the fold enters the presser.

(21) In another variant of the invention, the sealer contacts the web when the displacing portion of the fold maker is in the first position to locate a portion of the web into the receiving portion to form the fold. The sealer is out of contact with the web when the displacing portion of the fold maker is in the second position outside of the fold, thereby permitting the fold to enter the presser.

(22) In still another variant, the sealer provides lower and upper parallel seams across the web through the fold and the cutter severs the web between the lower and upper parallel seams.

(23) In yet another variant, a bag mouth cutter is provided. The bag mouth cutter cuts a cut-out that commences at a first point along the upper seam spaced inwardly from a first outside edge of the web and extends to a second point along the upper seam spaced inwardly from a second outside edge of the web. The cut-out extends downwardly toward a subsequent lower seam, thereby defining an open bag mouth and first and second bag handles.

(24) In a further variant, a gusseter is provided. The gusseter causes at least one of the outside edges of the web to be positioned inwardly between the first surface and the second surface of the web prior to forming the fold.

(25) In still a further variant, the top and bottom edges of the gussets are sealed together at the upper seam and the lower seam through at least twelve layers of film.

(26) In another variant, a winder is provided. The winder winds the web onto a storage reel for later processing.

(27) In yet a further variant, a method for making a film bag with reinforced bag seams includes the steps of: Providing a film extruder. The extruder produces a continuous tube of film material. Providing a flattener. The flattener produces a continuous web of flattened film material. The web has a first surface and a second surface. Providing a fold maker. The fold maker has a displacing portion and a receiving portion. The receiving portion is positioned adjacent the first surface of the web. The displacing portion is positioned adjacent the second surface of the web.

Moving the displacing portion cyclically toward the second surface to a first position to locate a portion of the web into the receiving portion, thereby forming a fold in the web. Moving the displacing portion cyclically away from the second surface to a second position outside of the fold. The fold has a leading surface, a trailing surface, a first edge positioned adjacent the web and a second edge spaced from the first edge. Providing a fold retention device. The retention device prevents the fold from opening as the web moves through the apparatus. Providing a presser. The presser is positioned adjacent the first surface the web and urges the fold against the web after folding. Providing a sealer. The sealer provides at least one seam across the web through the fold, thereby sealing at least six layers of film together to form a reinforced bag seam. Providing a cutter. The cutter severs a sealed portion of the web from a remaining portion of the web. Providing a transport mechanism. The transport mechanism moves the flattened film material from the extruder, through the flattener, into the fold maker, beneath the presser, into the sealer and to the cutter.

(28) In another variant of the invention, the method for making a film bag with reinforced bag seams further includes the step of: Providing the fold retention device with at least one tack welding element. The element welding the web through the fold from the first surface to the second surface. The element is sized, shaped and positioned to weld the web through the fold adjacent the first edge.

(29) In still another variant, the method for making a film bag with reinforced bag seams further includes the step of welding the web through the fold adjacent the first edge and adjacent the second edge.

(30) In yet another variant, the method for making a film bag with reinforced bag seams further includes the step of providing the displacing portion of the fold maker with at least one opening. The opening is sized, shaped and positioned to provide a path for welding the upper surface to the lower surface.

(31) In a further variant, the method for making a film bag with reinforced bag seams further includes the following steps. Providing the transport mechanism with at least first and second drive rollers. The first drive roller is movably located adjacent the first surface of the web before the fold maker and the second drive roller is located in contact with the web between the presser and the sealer. Moving the first drive roller out of contact with the web when the displacing portion of the fold maker is in the first position to locate a portion of the web into the receiving portion to form the fold. Moving the first drive roller into contact with and driving the web when the displacing portion of the fold maker is in the second position outside of the fold, thereby preventing the fold from opening as the fold enters the presser.

(32) In still a further variant, the method for making a film bag with reinforced bag seams further includes the steps of moving the sealer to contact the web when the displacing portion of the fold maker is in the first position to locate a portion of the web into the receiving portion to form the fold and moving the sealer out of contact with the web when the displacing portion of the fold maker is in the second position outside of the fold, thereby permitting the fold to enter the presser.

(33) In yet a further variant, the method for making a film bag with reinforced bag seams further includes the steps of providing lower and upper parallel seams across the web through the fold and severing the web between the lower and upper parallel seams.

(34) In another variant of the invention, the method for making a film bag with reinforced bag seams further includes the step of providing a bag mouth cutter. The bag mouth cutter cuts a cut-out that commences at a first point along the upper seam spaced inwardly from a first outside edge of the web and extends to a second point along the upper seam spaced inwardly from a second outside edge of the web. The cut-out extends downwardly toward a subsequent lower seam, thereby defining an open bag mouth and first and second bag handles.

(35) In still another variant, the method for making a film bag with reinforced bag seams further includes the step of providing a gusseter. The gusseter causes at least one of the outside edges of the web to be positioned inwardly between the first surface and the second surface of the web prior to forming the fold.

(36) In yet another variant, the method for making a film bag with reinforced bag seams further includes the step of sealing together the top and bottom edges of the gussets at the upper seam and the lower seam through at least twelve layers of film.

(37) In yet another variant, the method for making a film bag with reinforced bag seams further includes the steps of providing a winder. The winder winds the continuous web of flattened film material onto a storage reel for later processing. Unwinding the web from the storage reel. Feeding the web into the fold maker.

An appreciation of the other aims and objectives of the present invention and an understanding of it may be achieved by referring to the accompanying drawings and the detailed description of a preferred embodiment.

DESCRIPTION OF THE DRAWINGS

FIG. 2 is a perspective view of the fold maker of the FIG. 1 embodiment;

FIG. 3 is a perspective view of the fold formed for an ungusseted bag formed by the FIG. 1 embodiment;

DETAILED DESCRIPTION OF THE PREFERRED EMBODIMENT

Figure 1:
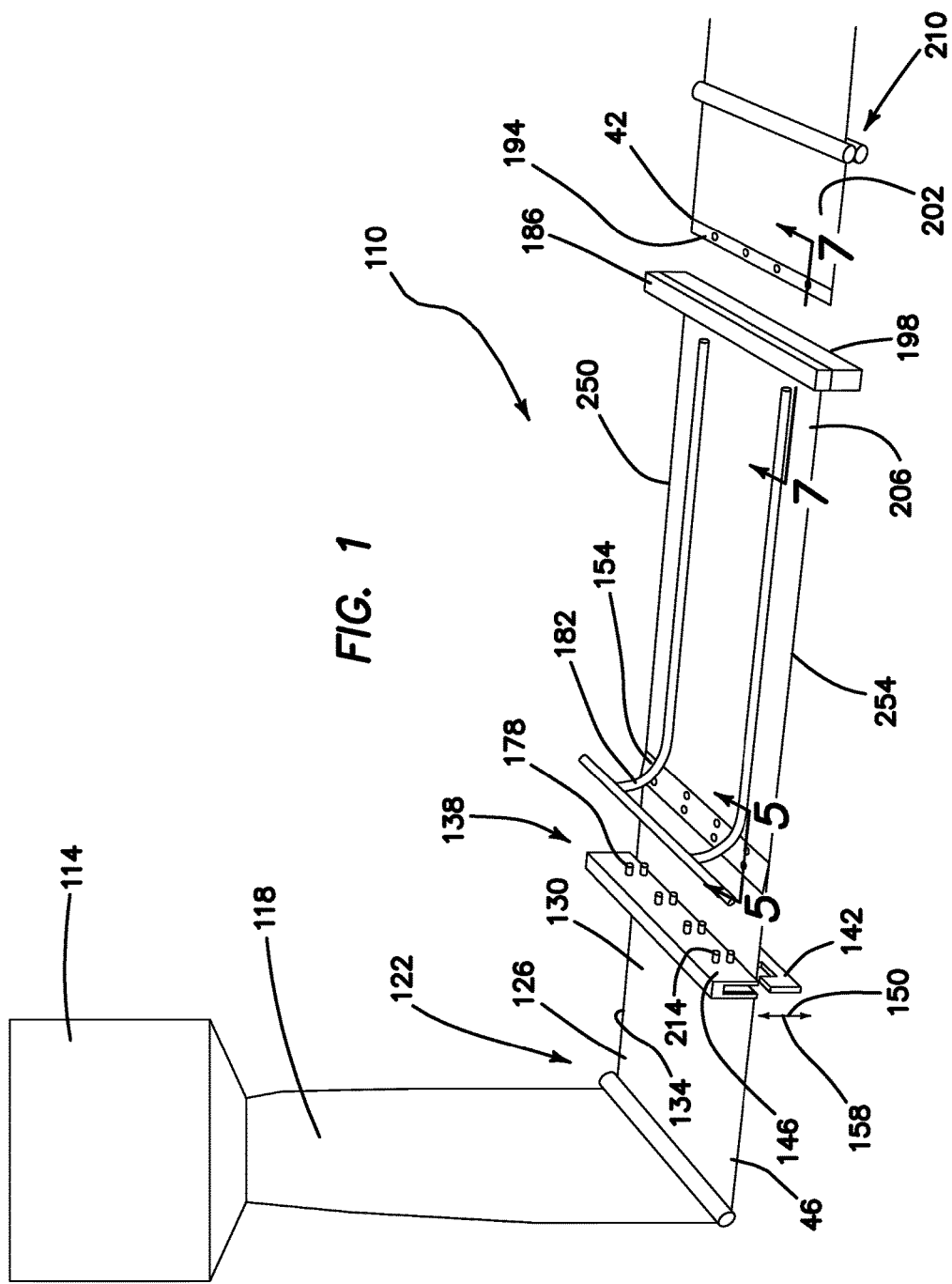
FIG. 1 is a perspective view of a preferred embodiment of the apparatus for manufacturing an ungusseted bag with reinforced bag seam and the flattened bag web.
Figure 4:
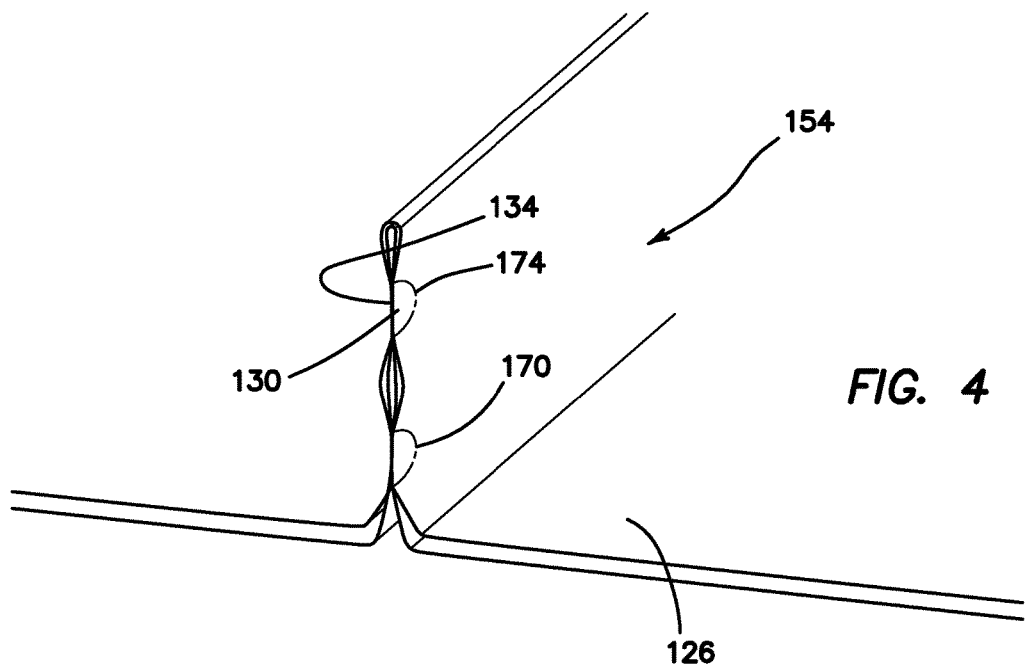
FIG. 4 is a cross-sectional perspective view of the FIG. 3 fold after tack welding.
Figure 5:
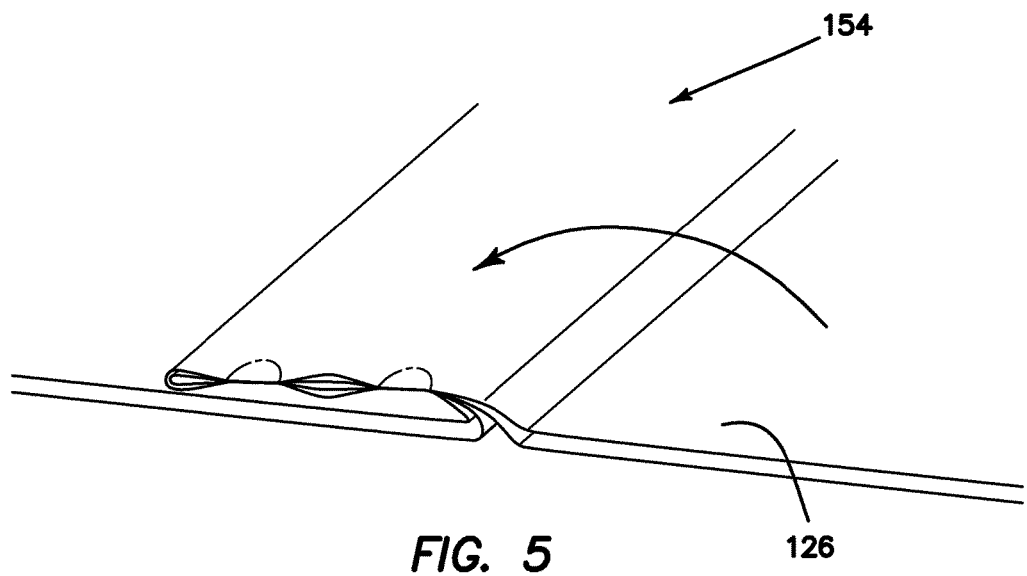
FIG. 5 is a cross-sectional perspective view of the FIG. 1 bag web taken along the line 5-5.
Figure 6:
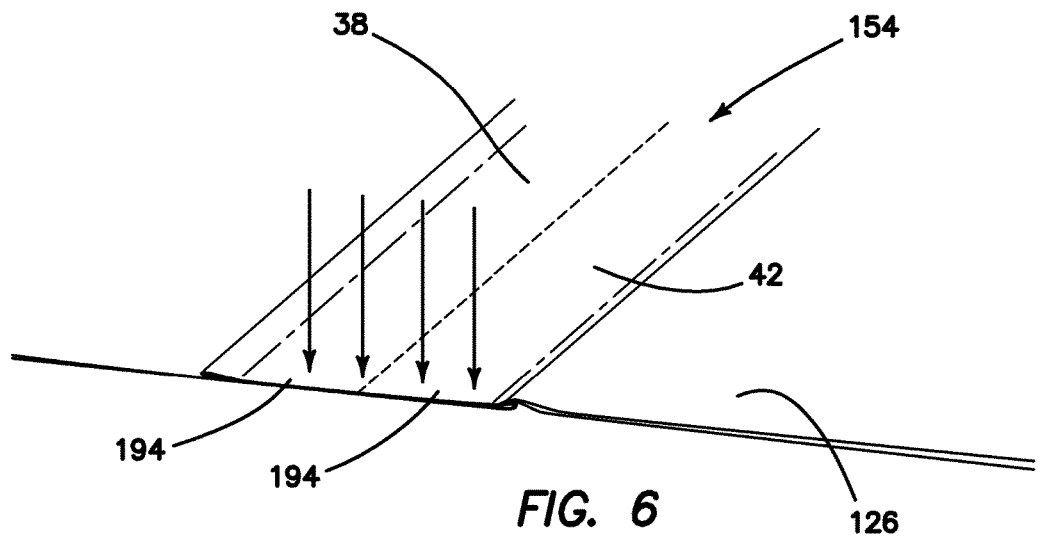
FIG. 6 is a cross-sectional perspective view of the FIG. 1 bag web after sealing and prior to cutting.
Figure 7:
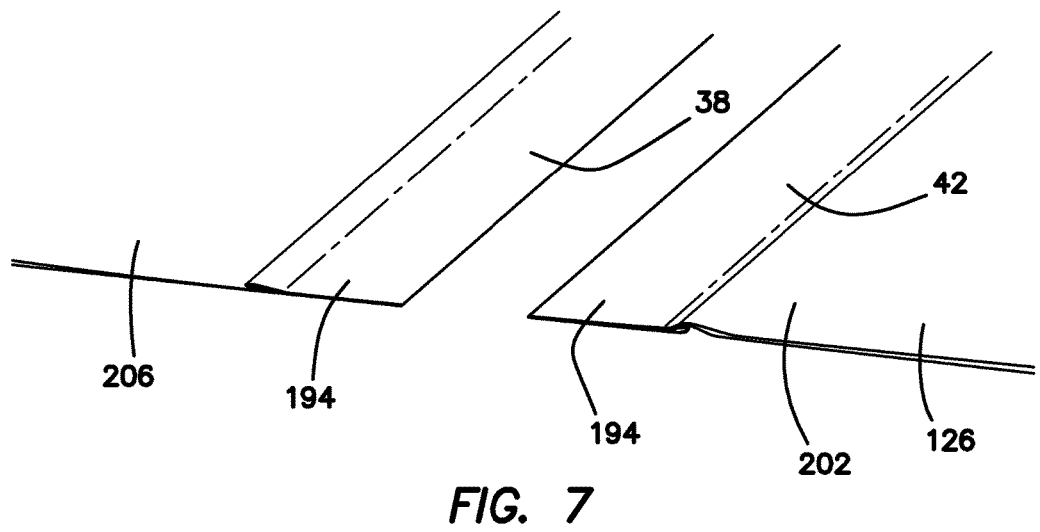
FIG. 7 is a cross-sectional perspective view of the FIG. 1 bag web taken along the line 7-7.

The present invention addresses all of the deficiencies of prior art reinforced bag seam inventions and satisfies all of the objectives described above.

(1) FIGS. 1-22 illustrate a film bag with reinforced bag seams 10 that can be constructed from the following components. As illustrated in FIG. 15, a front wall 14 and a back wall 18 are provided. The walls 14, 18 are joined at first 22 and second 26 side edges. Each of the front 14 and back 18 walls has a top edge 30 and a bottom edge 34. A fold 154 is provided. The fold 154 is located in the front 14 and back 18 walls. The fold 154 is positioned in a plane parallel to said front wall 14. At least one pair of the top 30 and bottom 34 edges is sealed together at either of an upper seam 38 and a lower seam 42 through the fold 154 and at least six layers of film 46.

Figure 14:
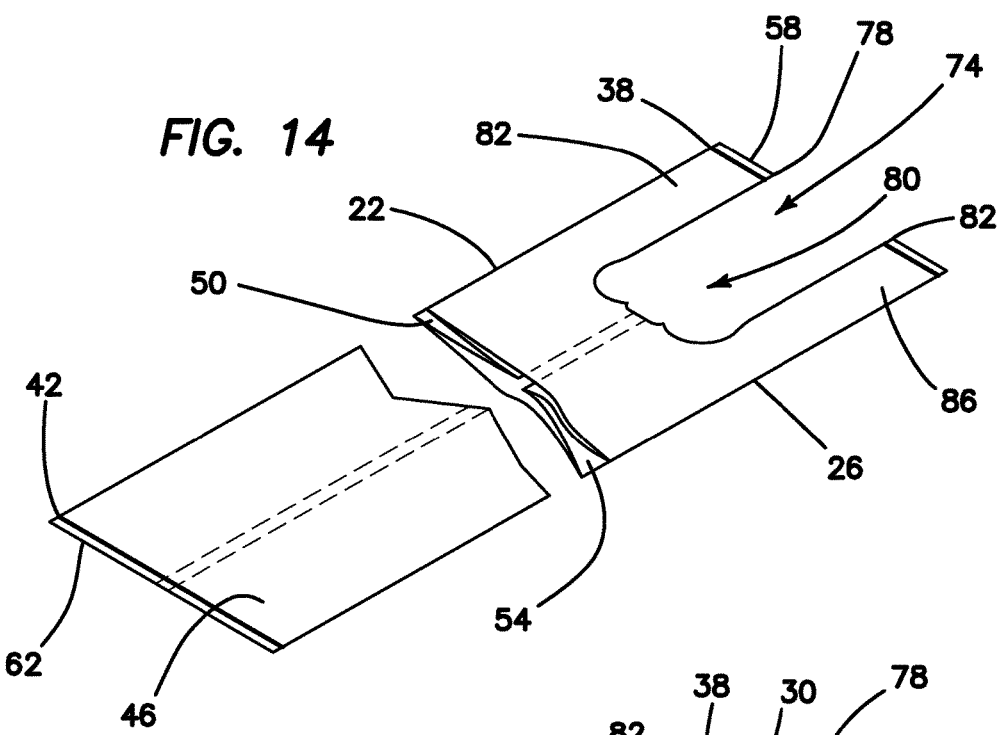
FIG. 14 is a sectioned perspective view of a gusseted T-shirt style bag with reinforced upper and lower seams.
Figure 15:
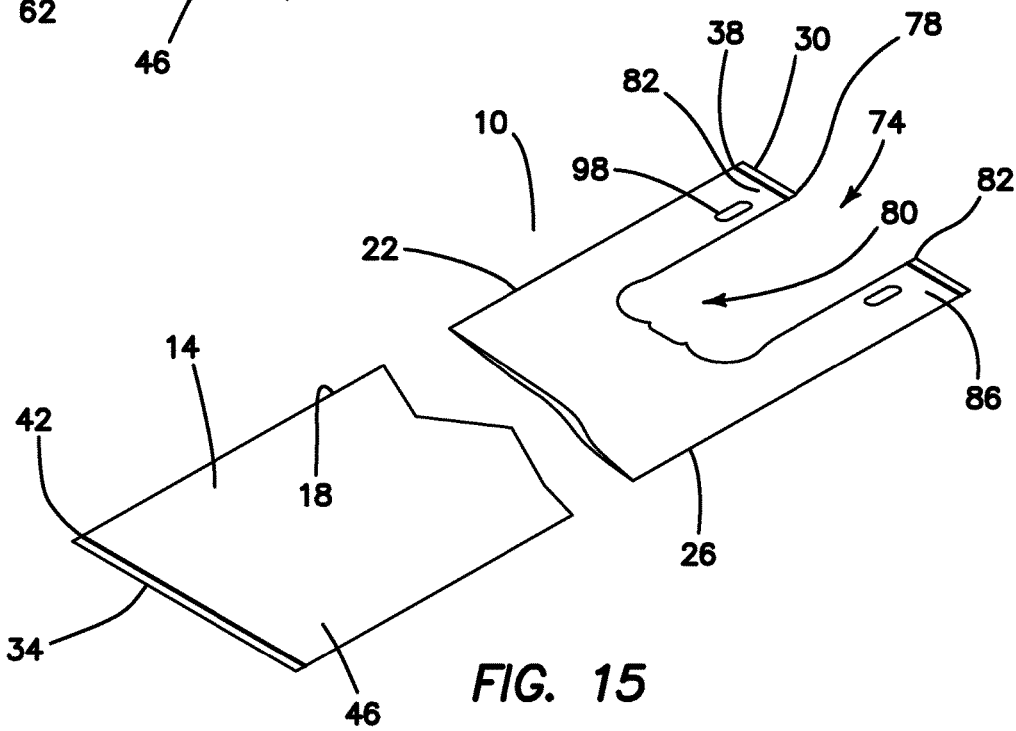
FIG. 15 is a sectioned perspective view of an ungusseted T-shirt style bag with reinforced upper and lower seams.

(2) In a variant of the invention, as illustrated in FIG. 14, first 50 and second 54 side gussets are provided. Each of the gussets 50, 54 is folded inwardly from one of the first 22 and second 26 side edges. The gussets 50, 54 have a top edge 58 and a bottom edge 62. At least one pair of the top 58 and bottom edges 62 of the gussets 50, 54 is sealed together at either of the upper seam 38 and the lower seam 42 through the fold 154 and at least twelve layers of film 46.

Figure 19:
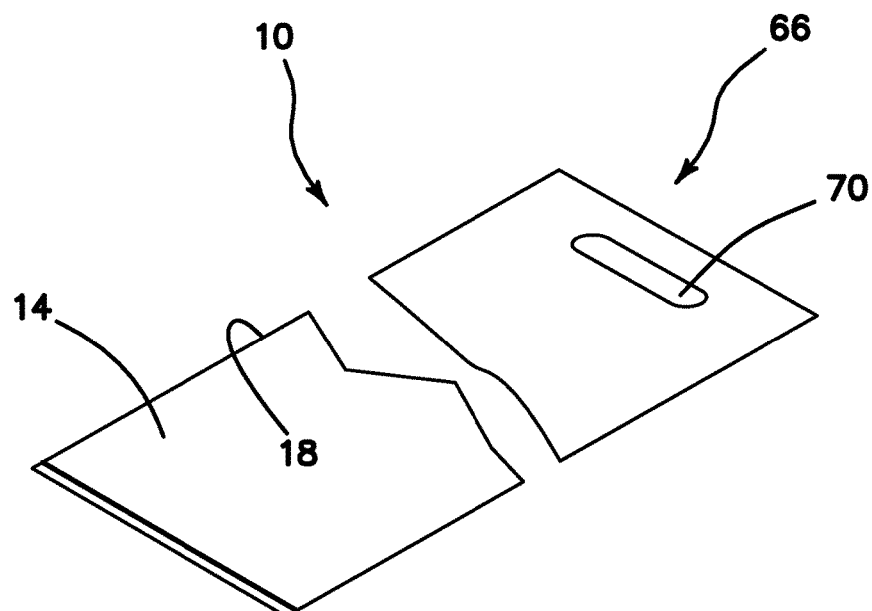
FIG. 19 is a perspective view of a bag with a handle aperture having a reinforced bag seam.

(3) In another variant, as illustrated in FIG. 19, the bag with reinforced seams 10 includes an open bag mouth 66 and a handle aperture 70. The handle aperture 70 penetrates the front wall 14 and the back wall 18.

(4) In still another variant, as illustrated in FIG. 15, the top 30 and bottom 34 edges are sealed together at the upper seam 38 and the lower seam 42 through the fold 154 and at least six layers of film 46. The bag 10 further includes a cut-out 74. The cut-out 74 commences at a first point 78 along the upper seam 38 spaced inwardly from the first side edge 22 and extends to a second point 82 along the upper seam 38 spaced inwardly from the second side edge 26. The cut-out 74 extends downwardly toward the lower seam 42, thereby defining an open bag mouth 80 and first 82 and second 86 bag handles.

(5) In yet another variant, as illustrated in FIG. 14, the top 58 and bottom 62 edges of the gussets 50, 54 are sealed together at the upper seam 38 and the lower seam 42 through the fold 154 and at least twelve layers of film 46. The bag 10 further includes a cut-out 74. The cut-out 74 commences at a first point 78 along the upper seam 38 spaced inwardly from the first side edge 22 and extends to a second point 82 along the upper seam 38 spaced inwardly from the second side edge 26. The cut-out 74 extends downwardly toward the lower seam 42, thereby defining an open bag mouth 80 and first 82 and second 86 bag handles.

Figure 20:
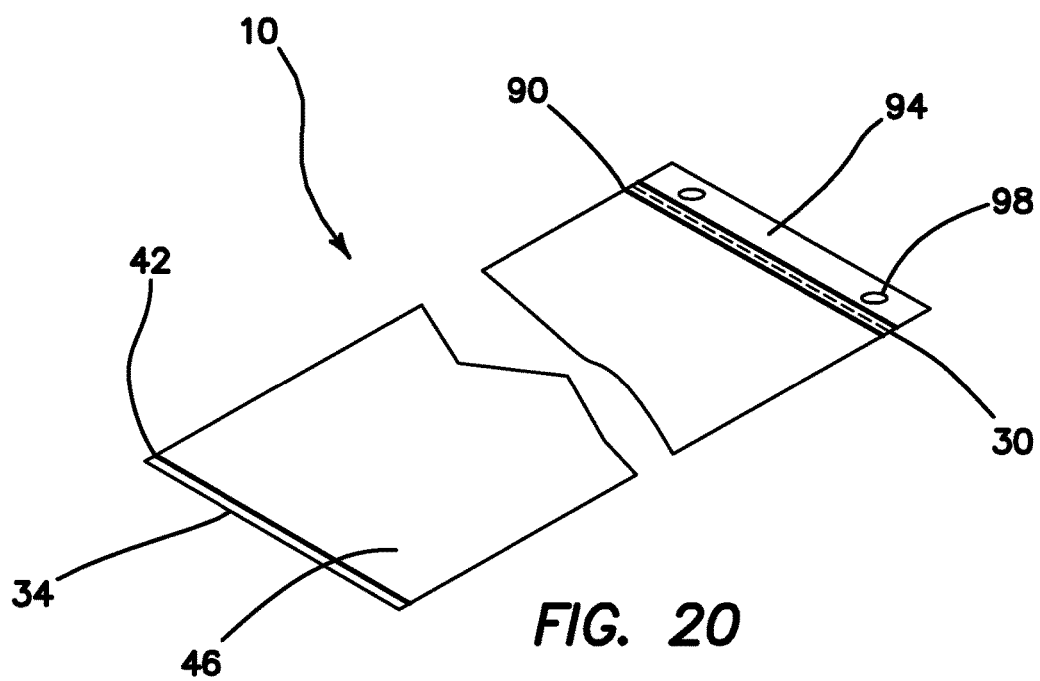
FIG. 20 is a perspective view of a header bag having a reinforced bag seam.

(6) In a further variant, as illustrated in FIG. 20, the top edges 30 of the film bag 10 are joined at a perforation 90 to a header portion 94. The header portion 94 is removed from the bag 10 for use of the bag 10.

(7) In still a further variant, at least one aperture 98 is provided for suspending a pack (not shown) of the bags 10 from a dispensing fixture (not shown).

(8) In yet a further variant, the film 46 includes about 40-48 wt. % high density, high molecular weight polyethylene, 12-20 wt. % high density, medium molecular weight polyethylene, 20-30 wt. % linear low density polyethylene, 0-8 wt. % color concentrate.

(9) In another variant of the invention, the film 46 includes 0.5 wt. % slip and antiblock compound.

(10) In still another variant, the film 46 includes 1-3 wt. % calcium carbonate.

(11) In yet another variant, the film 46 includes 10-20 wt. % recycled material, the recycled material includes about 40-48 wt. % high density, high molecular weight polyethylene, 12-20 wt. % high density, medium molecular weight polyethylene, 20-30 wt. % linear low density polyethylene, 0-8 wt. % color concentrate.

(12) In a further variant, the 10-15 wt. % of the linear low density polyethylene has a density ranging from 0.923-0.924 gm/cc.

(13) In still a further variant, the 10-15 wt. % of the linear low density polyethylene has a melt index ranging from 0.25-0.30 gm/10 minutes.

(14) In yet a further variant, the high density, medium molecular weight polyethylene has a density ranging from 0.937-0.947 gm/cc.

(15) In another variant of the invention, the high density, medium molecular weight polyethylene has a melt index ranging from 0.10-0.30 gm/10 minutes.

(16) In still another variant, as illustrated in FIGS. 1-7 and 8-13, an apparatus 110 for making a film bag with reinforced bag seams 10, includes a film extruder 114. The extruder 114 produces a continuous tube 118 of film material 46. A flattener 122 is provided. The flattener 122 produces a continuous web 126 of flattened film material 46. The web 126 has a first surface 130 and a second surface 134. A fold maker 138 is provided. The fold maker 138 has a displacing portion 142 and a receiving portion 146. The receiving portion 146 is positioned adjacent the first surface 130 of the web 126. The displacing portion 142 is positioned adjacent the second surface 134 of the web 126 and moves cyclically toward the second surface to a first position 150 to locate a portion of the web 126 into the receiving portion 146, thereby forming a fold 154 in the web 126. The displacing portion 142 moves cyclically away from the second surface to a second position 158 outside of the fold 154. The fold 154 has a leading surface 162, a trailing surface 166, a first edge 170 positioned adjacent the web 126 and a second edge 174 spaced from the first edge 170.

A fold retention device 178 is provided. The retention device 178 prevents the fold 154 from opening as the web 126 moves through the apparatus 110. A presser 182 is provided. The presser 182 is positioned adjacent the first surface of the web 126 and urges the fold 154 against the web 126 after folding. A sealer 186 is provided. The sealer 186 provides at least one seam 38, 42 across the web 126 through the fold 154, thereby sealing at least six layers of film 46 together to form a reinforced bag seam 194. A cutter 198 is provided. The cutter 198 severs a sealed portion 202 of the web 126 from a remaining portion 206 of the web 126. A transport mechanism 210 is provided. The transport mechanism 210 moves the flattened film material 46 from the extruder 114, through the flattener 122, into the fold maker 138, beneath the presser 182, into the sealer 186 and to the cutter 198.

(17) In yet another variant, the fold retention device 178 further includes at least one tack welding element 214. The element 214 welds the web 126 through the fold 154 from the leading surface 130 to the trailing surface 134. The element 214 is sized, shaped and positioned to weld the web 126 through the fold 154 adjacent the first edge 170.

(18) In a further variant, the element 214 is sized, shaped and positioned to weld the web 126 through the fold 154 adjacent the first edge 170 and adjacent the second edge 174.

(19) In still a further variant, the displacing portion 142 of the fold maker 138 includes at least one opening 218, the opening 218 is sized, shaped and positioned to provide a path 222 for welding the upper surface 130 to the lower surface 134.

Figure 16:
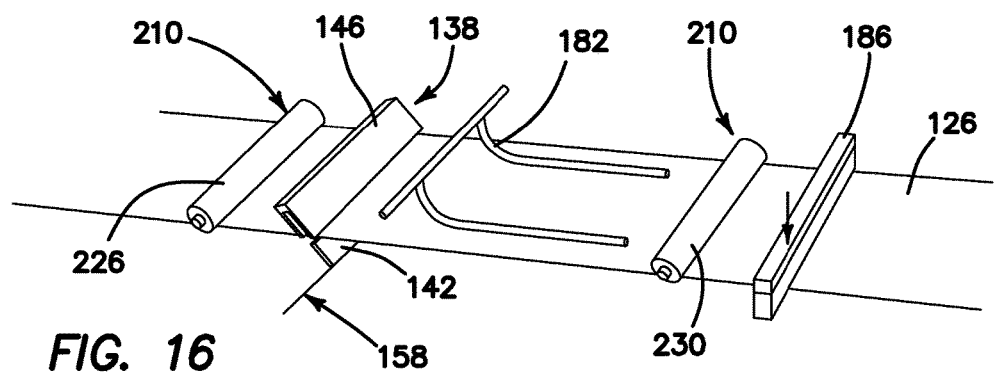
FIG. 16 is a perspective view of a fold retention mechanism for an apparatus for making a bag with a reinforced bag seam prior to forming a fold in a bag stream.
Figure 17:
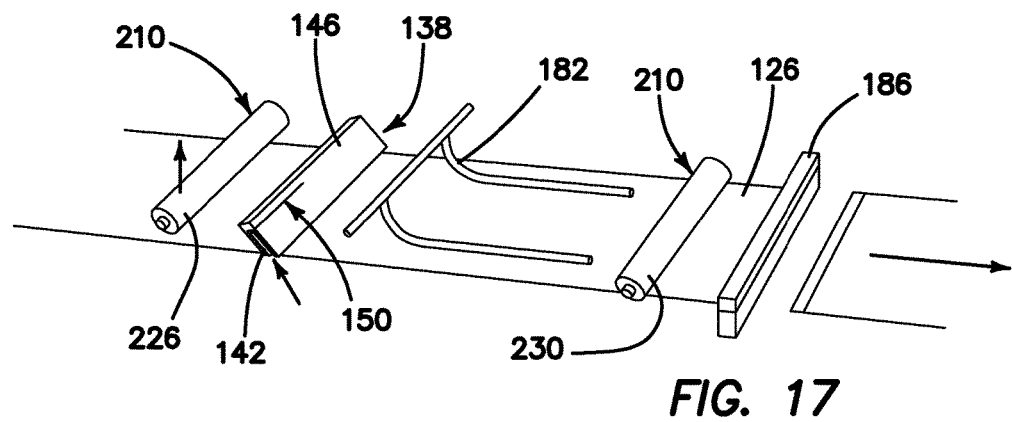
FIG. 17 is a perspective view of the FIG. 14 embodiment after formation of the fold by the displacing portion of the fold maker and after sealing bottom of a prior bag and the top of the present bag.
Figure 18:
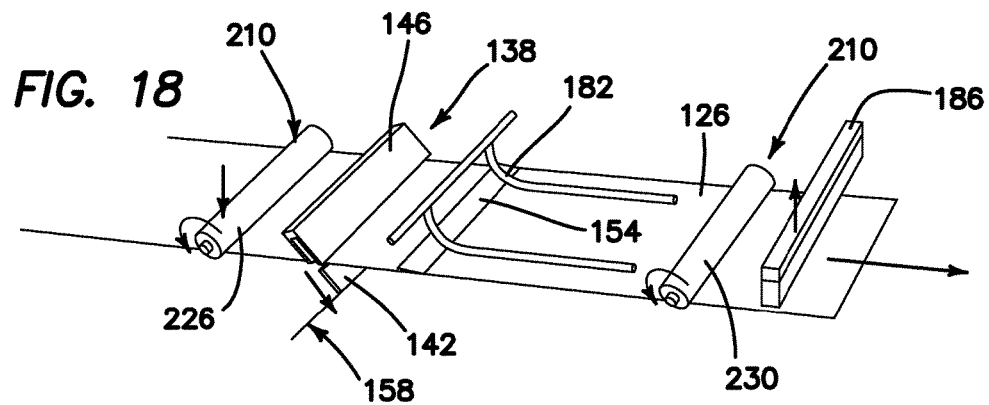
FIG. 18 is a perspective view of the FIG. 14 embodiment after withdrawal of the displacing portion of the fold maker and after the fold enters the presser.

(20) In yet a further variant, as illustrated in FIGS. 16-18, the transport mechanism 210 includes first 226 and second 230 drive rollers. The first drive roller 226 is movably located above the web 126 before the fold maker 138 and the second drive roller 230 is located in contact with the web 126 between the presser 182 and the sealer 186. The first drive roller 226 is out of contact with the web 126 when the displacing portion 142 of the fold maker 138 is in the first position 150 to locate a portion of the web 126 into the receiving portion 146 to form the fold 154. The first drive roller 226 is in contact with and driving the web 126 when the displacing portion 142 of the fold maker 138 is in the second position 158 outside of the fold 154, thereby preventing the fold 154 from opening as the fold 154 enters the presser 182.

(21) In another variant of the invention, the sealer 186 contacts the web 126 when the displacing portion 142 of the fold maker 138 is in the first position 150 to locate a portion of the web 126 into the receiving portion 146 to form the fold 154. The sealer 186 is out of contact with the web 126 when the displacing portion 142 of the fold maker 138 is in the second position 158 outside of the fold 154, thereby permitting the fold 154 to enter the presser 182.

(22) In still another variant, as illustrated in FIGS. 6-7 and 12-13, the sealer 186 provides lower 42 and upper 38 parallel seams across the web 126 through the fold 154 and the cutter 198 severs the web 126 between the lower 42 and upper 38 parallel seams.

(23) In yet another variant, as illustrated in FIGS. 1 and 14-15, a bag mouth cutter (not shown) is provided. The bag mouth cutter 246 cuts a cut-out 74 that commences at a first point 78 along the upper seam 38 spaced inwardly from a first outside edge 250 of the web 126 and extends to a second point 82 along the upper seam 38 spaced inwardly from a second outside edge 254 of the web 126. The cut-out 74 extends downwardly toward a subsequent lower seam 42, thereby defining an open bag mouth 78 and first 82 and second 86 bag handles.

Figure 8:
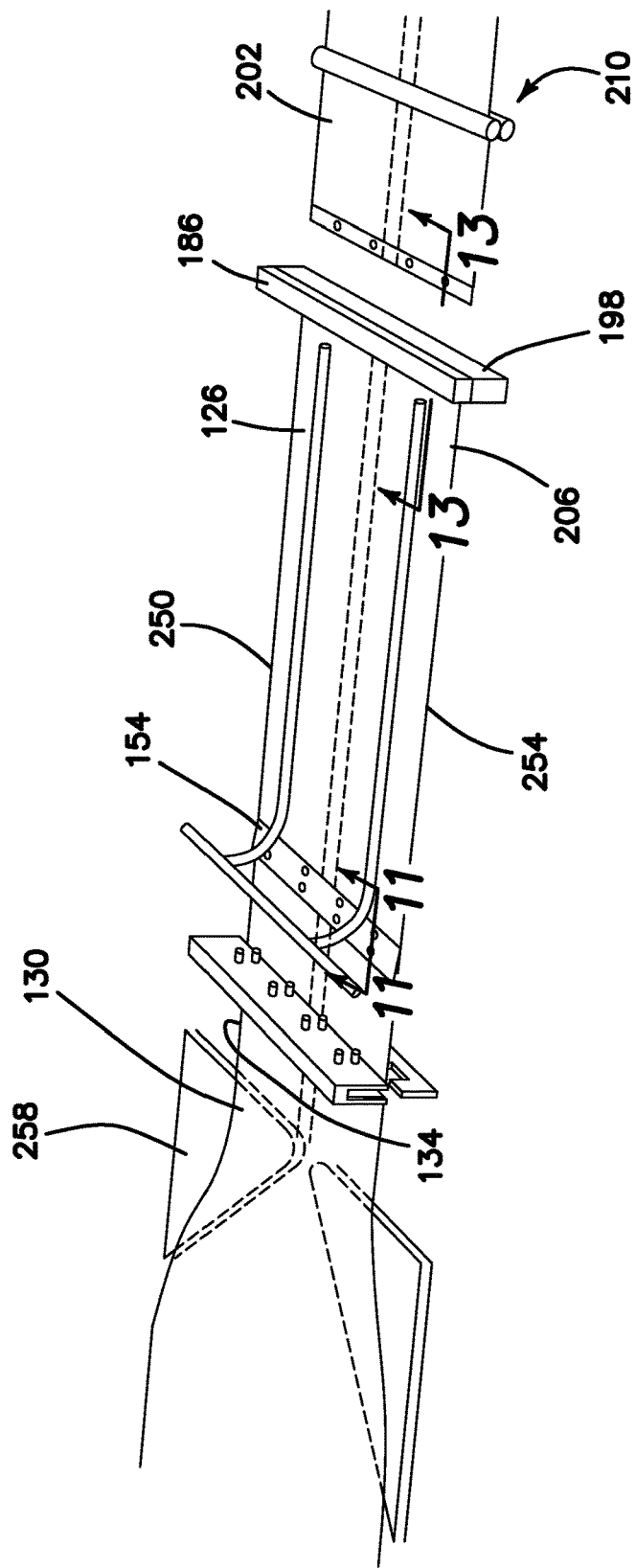
FIG. 8 is a perspective view of a preferred embodiment of the apparatus for manufacturing a gusseted bag with reinforced bag seam and the flattened bag web.
Figure 9:
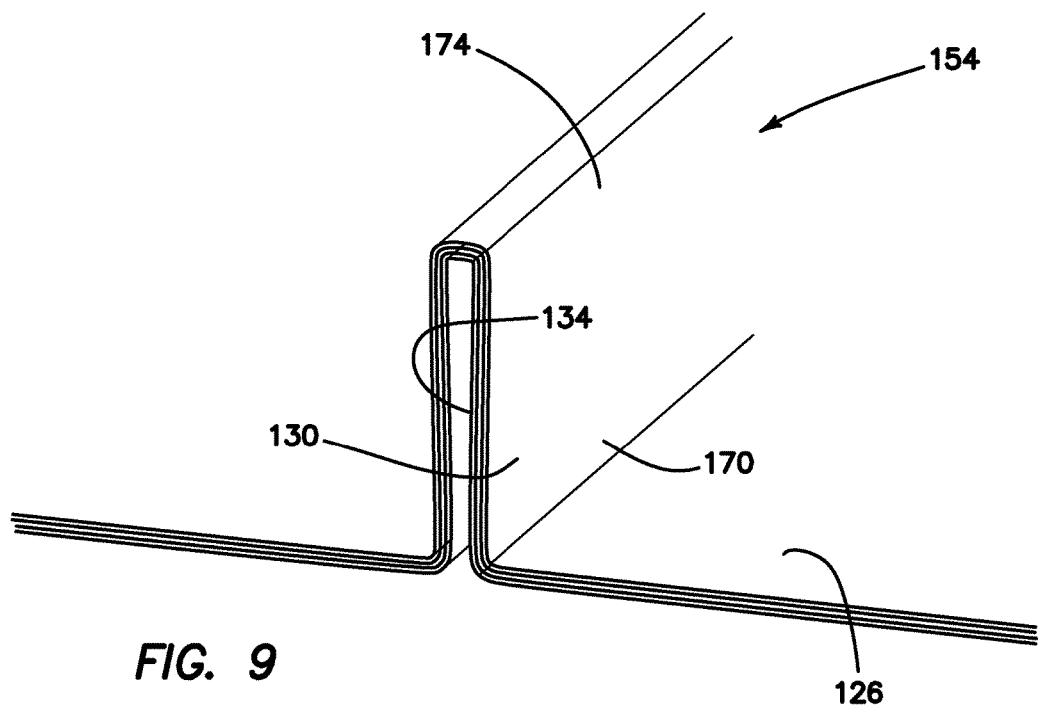
FIG. 9 is a perspective view of the fold formed for a gusseted bag formed by the FIG. 8 embodiment.
Figure 10:
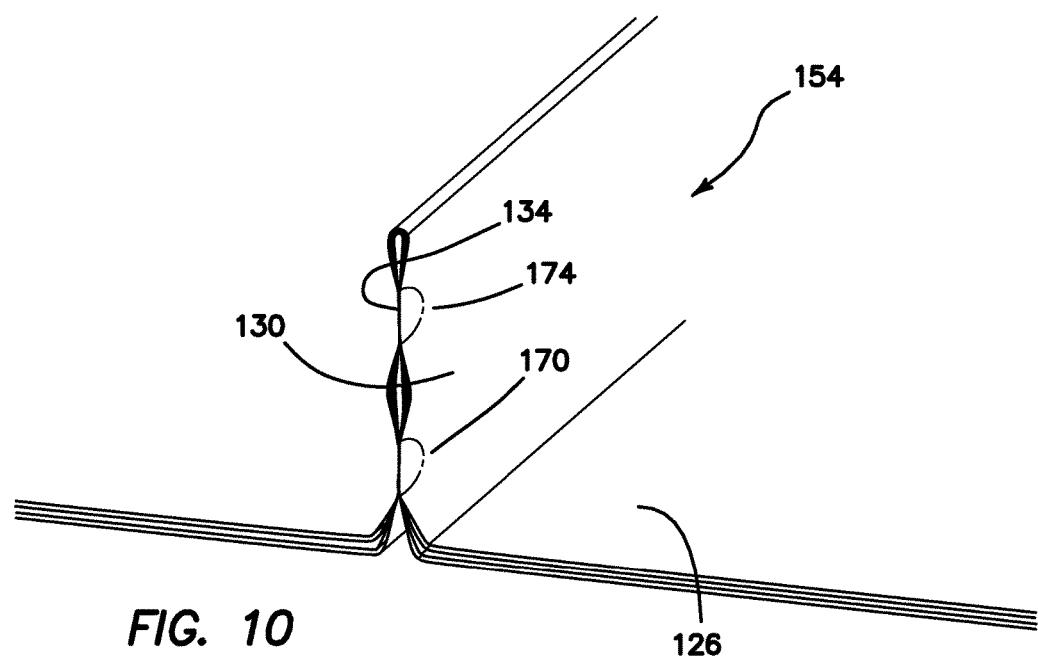
FIG. 10 is a cross-sectional perspective view of the FIG. 9 fold after tack welding.
Figure 11:
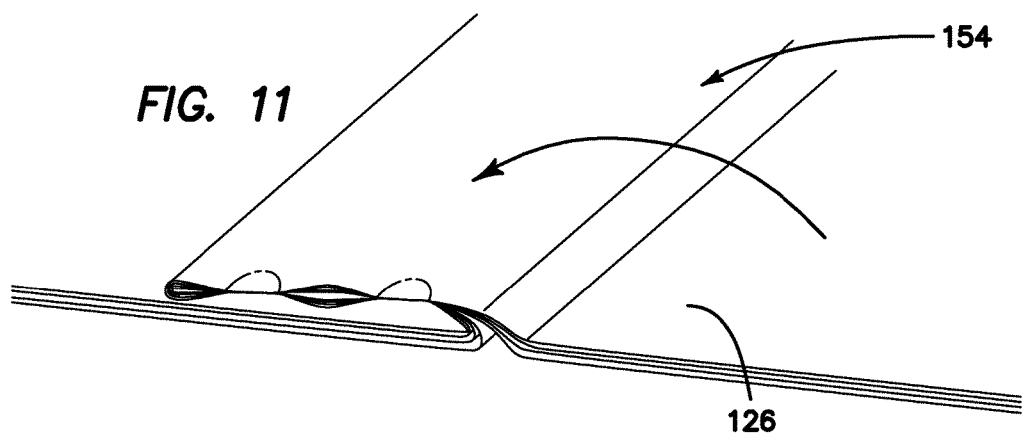
FIG. 11 is a cross-sectional perspective view of the FIG. 8 bag web taken along the line 11-11.
Figure 12:
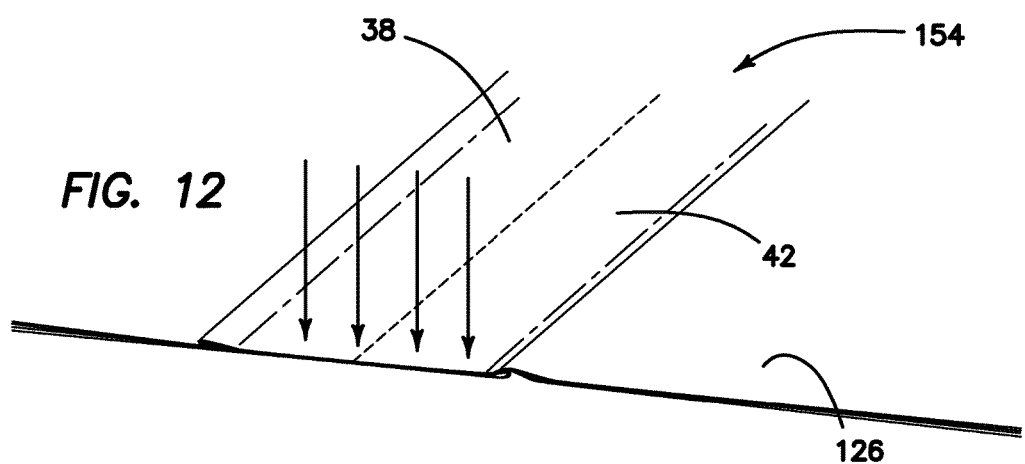
FIG. 12 is a cross-sectional perspective view of the FIG. 8 bag web after sealing and prior to cutting.
Figure 13:
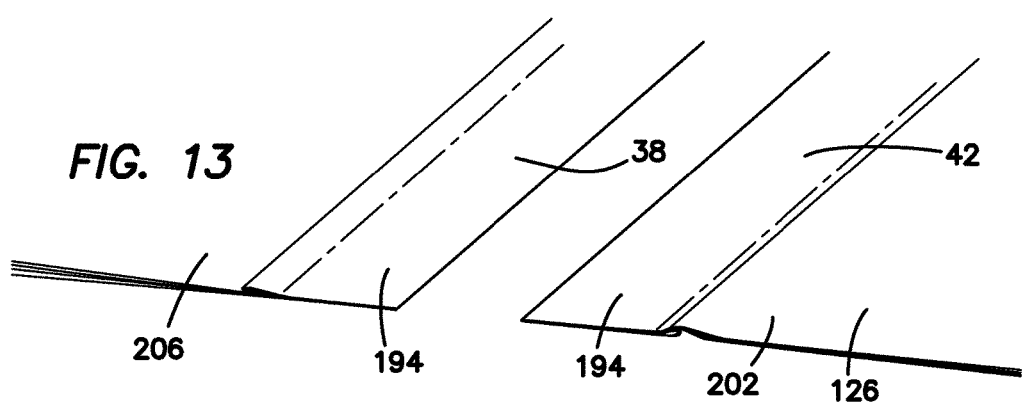
FIG. 13 is a cross-sectional perspective view of the FIG. 1 bag web taken along the line 13-13.

(24) In a further variant, as illustrated in FIG. 8, a gusseter 258 is provided. The gusseter 258 causes at least one of the outside edges 250, 254 of the web 126 to be positioned inwardly between the first surface 130 and the second surface 134 of the web 126 prior to forming the fold 154.

(25) In still a further variant, as illustrated in FIG. 14, the top 58 and bottom 62 edges of the gussets 50, 54 are sealed together at the upper seam 38 and the lower seam 42 through at least twelve layers of film 46.

Figure 21:
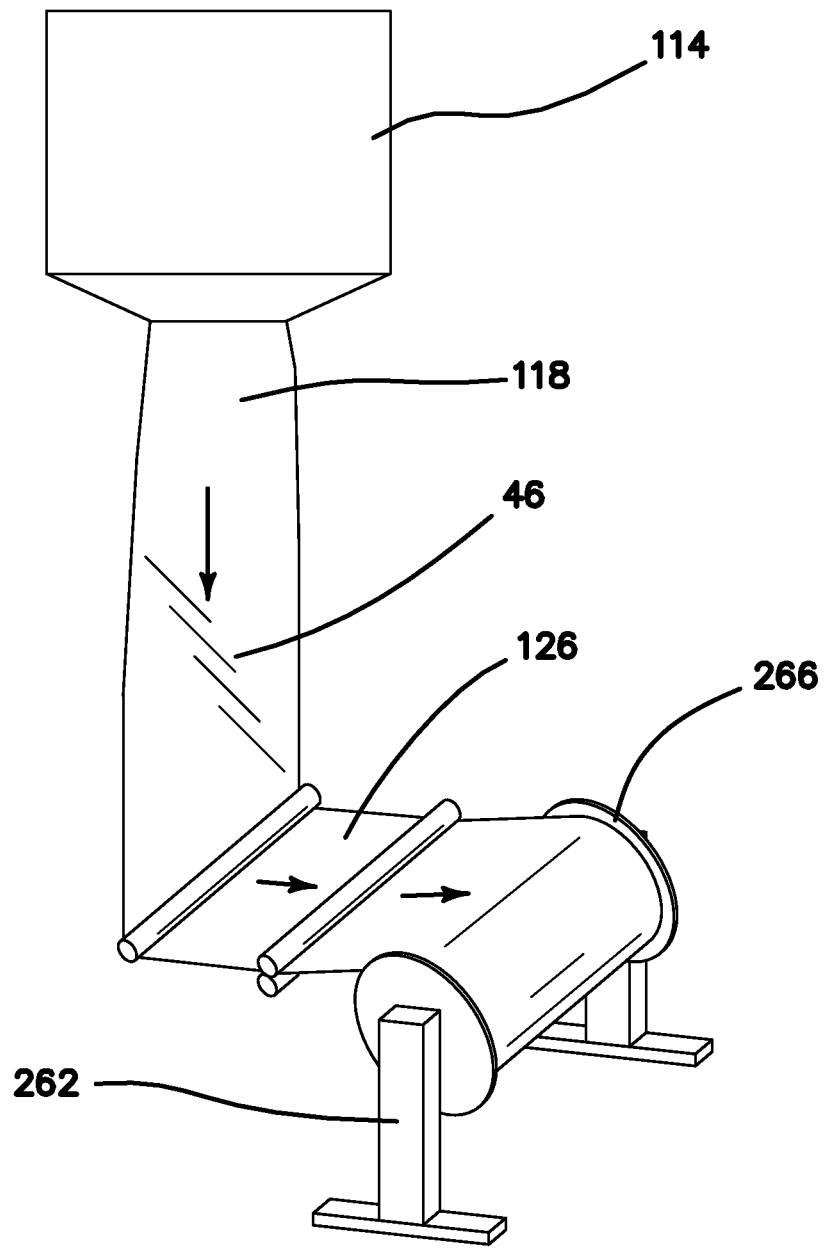
FIG. 21 is a perspective view of an extruder for forming a tube of film material which is pressed into a flattened web and wound onto a storage reel for later use.
Figure 22:
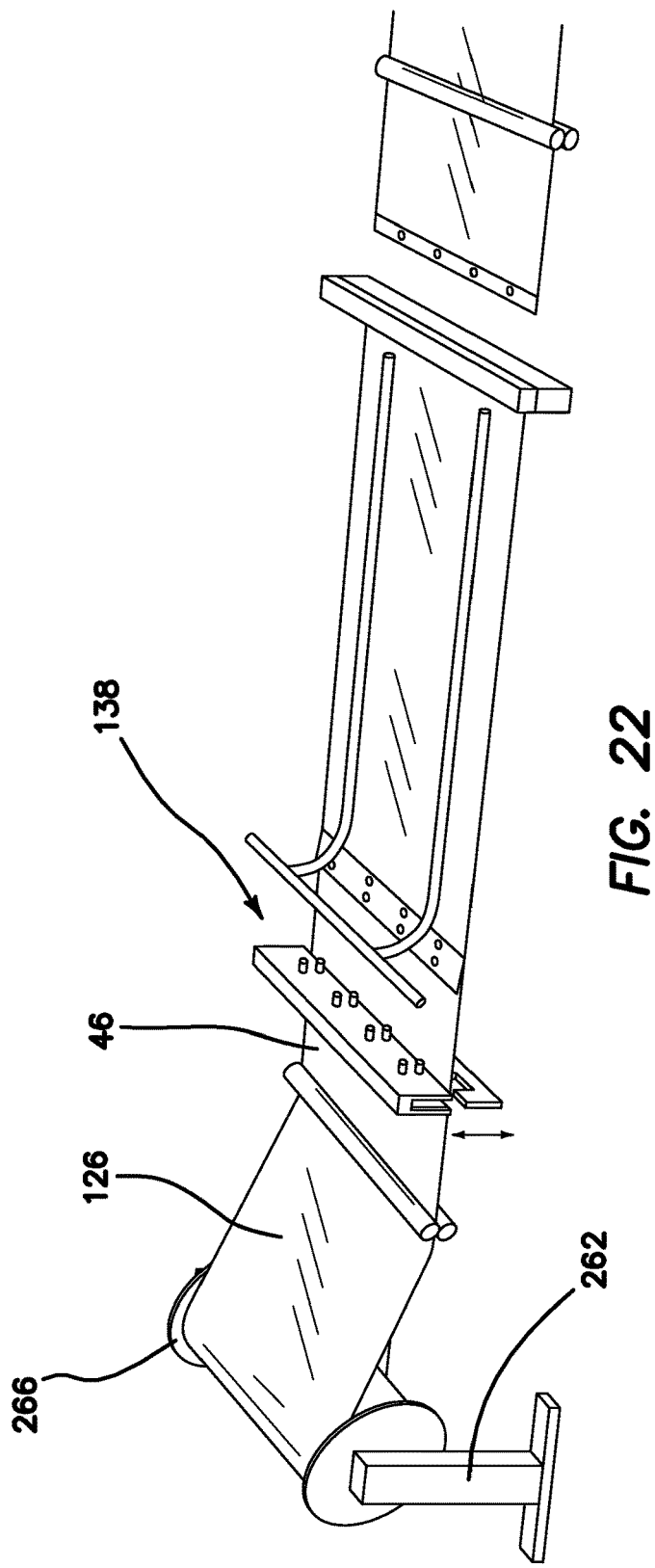
FIG. 22 is a perspective view of an apparatus for taking a flattened web of film material and adding a reinforced bottom seam prior to forming a bag from the web.

(26) In another variant of the invention, as illustrated in FIGS. 21 and 22, a winder 262 is provided. The winder 262 winds the web 126 onto a storage reel 266 for later processing.

(27) In yet a further variant, as illustrated in FIGS. 1-7, a method for making a film bag with reinforced bag seams 10 includes the steps of: Providing a film extruder 114. The extruder 114 produces a continuous tube 118 of film material 46. Providing a flattener 122. The flattener 122 produces a continuous web 126 of flattened film material 46. The web 126 has a first surface 130 and a second surface 134. Providing a fold maker 138. The fold maker 138 has a displacing portion 142 and a receiving portion 146. The receiving portion 146 is positioned adjacent the first surface 130 of the web 126. The displacing portion 142 is positioned adjacent the second surface 134 of the web 126.

Moving the displacing portion 142 cyclically toward the second to a first position 150 to locate a portion of the web 126 into the receiving portion 146, thereby forming a fold 154 in the web 126. Moving the displacing portion 142 cyclically away from the second surface to a second position 158 outside of the fold 154. The fold 154 has a leading surface 162, a trailing surface 166, a first edge 170 positioned adjacent the web 126 and a second edge 174 spaced from the first edge 170. Providing a fold retention device 178. The retention device 178 prevents the fold 154 from opening as the web 126 moves through the apparatus 110. Providing a presser 182. The presser 182 is positioned adjacent the first surface of the web 126 and urges the fold 154 against the web 126 after folding. Providing a sealer 186. The sealer 186 provides at least one seam 38, 42 across the web 126 through the fold 154, thereby sealing at least six layers of film 46 together to form a reinforced bag seam 194. Providing a cutter 198. The cutter 198 severs a sealed portion 202 of the web 126 from a remaining portion 206 of the web 126. Providing a transport mechanism 210. The transport mechanism 210 moves the flattened film material 46 from the extruder 114, through the flattener 122, into the fold maker 138, beneath the presser 182, into the sealer 186 and to the cutter 198.

(28) In another variant of the invention, the method for making a film bag with reinforced bag seams 10 further includes the step of: Providing the fold retention device 178 with at least one tack welding element 214. The element 214 welding the web 126 through the fold 154 from the first surface 130 to the second surface 134. The element 214 is sized, shaped and positioned to weld the web 126 through the fold 154 adjacent the first edge 170.

(29) In still another variant, the method for making a film bag with reinforced bag seams 10 further includes the step of welding the web 126 through the fold 154 adjacent the first edge 170 and adjacent the second edge 174.

(30) In yet another variant, the method for making a film bag with reinforced bag seams 10 further includes the step of providing the displacing portion 142 of the fold maker 138 with at least one opening 218. The opening 218 is sized, shaped and positioned to provide a path 222 for welding the upper surface 130 to the lower surface 134.

(31) In a further variant, as illustrated in FIGS. 16-18, the method for making a film bag with reinforced bag seams 10 further includes the steps of providing the transport mechanism 210 with at least first 226 and second 230 drive rollers. The first drive roller 226 is movably located above the web 126 before the fold maker 138 and the second drive roller 230 is located in contact with the web 126 between the presser 182 and the sealer 186. Moving the first drive roller 226 out of contact with the web 126 when the displacing portion 142 of the fold maker 138 is in the first position 150 to locate a portion of the web 126 into the receiving portion 146 to form the fold 154. Moving the first drive roller 226 into contact with and driving the web 126 when the displacing portion 142 of the fold maker 138 is in the second position 158 outside of the fold 154, thereby preventing the fold 154 from opening as the fold 154 enters the presser 182.

(32) In still a further variant, the method for making a film bag with reinforced bag seams 10 further includes the steps of moving the sealer 186 to contact the web 126 when the displacing portion 142 of the fold maker 138 is in the first position 150 to locate a portion of the web 126 into the receiving portion 146 to form the fold 154 and moving the sealer 186 out of contact with the web 126 when the displacing portion 142 of the fold maker 138 is in the second position 158 outside of the fold 154, thereby permitting the fold 154 to enter the presser 182.

(33) In yet a further variant, as illustrated in FIGS. 6-7 and 12-13, the method for making a film bag with reinforced bag seams 10 further includes the steps of providing lower 42 and upper 38 parallel seams across the web 126 through the fold 154. Severing the web 126 between the lower 42 and upper 38 parallel seams.

(34) In another variant of the invention, as illustrated in FIGS. 14 and 15, the method for making a film bag with reinforced bag seams 10 further includes the step of providing a bag mouth cutter (not shown). The bag mouth cutter cuts a cut-out 74 that commences at a first point 78 along the upper seam 38 spaced inwardly from a first outside edge 250 of the web 126 and extends to a second point 82 along the upper seam 38 spaced inwardly from a second outside edge 254 of the web 126. The cut-out 74 extends downwardly toward a subsequent lower seam 42, thereby defining an open bag mouth 78 and first 82 and second 86 bag handles.

(35) In still another variant, as illustrated in FIG. 8, the method for making a film bag with reinforced bag seams 10 further includes the step of providing a gusseter 258. The gusseter 258 causes at least one of the outside edges 250, 254 of the web 126 to be positioned inwardly between the upper surface 130 and the lower surface 134 of the web 126 prior to forming the fold 154.

(36) In yet another variant, the method for making a film bag with reinforced bag seams 10 further includes the step of sealing together the top 58 and bottom 62 edges of the gussets 50, 54 at the upper seam 38 and the lower seam 42 through at least twelve layers of film 46.

(37) In a final variant, the method for making a film bag with reinforced bag seams 10, as illustrated in FIGS. 21 and 22, includes the further steps of providing a winder 262. The winder 262 winds the continuous web 126 of flattened film material 46 onto a storage reel 266 for later processing, unwinding the web 126 from the storage reel 266, and feeding the web 126 into the fold maker 138.

An appreciation of the other aims and objectives of the present invention and an understanding of it may be achieved by referring to the accompanying drawings and the detailed description of a preferred embodiment.

The invention claimed is:

1. Film bags with at least one reinforced bag seam said bags, comprising:
   a single layer front wall and a single layer back wall formed from a continuous web of flattened film, said walls being joined at first and second side edges;
   each of said front and back walls having a top edge and a bottom edge;
   a fold formed in said continuous web of flattened film, said fold including said front and back walls;

said fold being rotated and disposed only on and in a plane parallel to said front wall to define at least six layers of film; and said fold being sealed to said front wall and said back wall by sealing through the at least six layers of film to produce at least one reinforced bag seam in said continuous web of flattened film; and a first portion of said at least one reinforced bag seam being severed from a second portion of said at least one reinforced bag seam to produce a lower seam on a first bag of said bags and an upper seam on an adjacent one of said bags, each of said lower and upper seams having said at least six layers of film exposed at their distal ends; and wherein no additional material is added to said at least one reinforced bag seam.

2. The film bags with at least one reinforced bag seam, as described in claim 1, further comprising:

first and second side gussets, each of said gussets being folded inwardly from one of said first and second side edges;

said gussets having a top edge and a bottom edge;

said fold being sealed to said front wall and said back wall by sealing through at least twelve layers of film to produce said at least one reinforced bag seam; and said first portion of said at least one reinforced bag seam being severed from said second portion of said at least one reinforced bag seam to produce said lower seam on said first bag of said bags and said upper seam on said adjacent one of said bags, each of said lower and upper seams having said at least twelve layers of film exposed at their distal ends; and wherein no additional material is added to said at least one reinforced bag seam.

3. The film bags with at least one reinforced bag seam, as described in claim 2, wherein said top and bottom edges of said gussets are sealed together at said upper seam and said lower seam through said fold and at least twelve layers of film and further comprising:

a cut-out, said cut-out commencing at a first point along said upper seam spaced inwardly from an outside edge of said first gusset and extending to a second point along said upper seam spaced inwardly from an outside edge of said second gusset, said cut-out extending downwardly toward said lower seam, thereby defining an open bag mouth and first and second bag handles.

4. The film bags with at least one reinforced bag seam, as described in claim 1, wherein said film comprises about 40-48 wt. % high density, high molecular weight polyethylene, 12-20 wt. % high density, medium molecular weight polyethylene, 20-30 wt. % linear low density polyethylene, 0-8 wt. % color concentrate.

5. The film bags with at least one reinforced bag seam, as described in claim 4, further comprising 0.5 wt. % slip and antiblock compound.

6. The film bags with at least one reinforced bag seam, as described in claim 4, further comprising 1-3 wt. % calcium carbonate.

7. The film bags with at least one reinforced bag seam, as described in claim 4, further comprising 10-20 wt. % recycled material, said recycled material comprising about 40-48 wt. % high density, high molecular weight polyethylene, 12-20 wt. % high density, medium molecular weight polyethylene, 20-30 wt. % linear low density polyethylene, 0-8 wt. % color concentrate.

8. The film bags with at least one reinforced bag seam, as described in claim 4, wherein 10-15 wt. % of said linear low density polyethylene has a density ranging from 0.923-0.924 gm/cc.

9. The film bags with at least one reinforced bag seam, as described in claim 4, wherein 10-15 wt. % of said linear low density polyethylene has a melt index ranging from 0.25-0.30 gm/10 minutes.

10. The film bags with at least one reinforced bag seam, as described in claim 4, wherein said high density, medium molecular weight polyethylene has a density ranging from 0.937-0.947 gm/cc.

11. The film bags with at least one reinforced bag seam, as described in claim 4, wherein said high density, medium molecular weight polyethylene has a melt index ranging from 0.10-0.30 gm/10 minutes.

* * * * *